J. H. WHAN.
WHIFFLETREE CONNECTION.
APPLICATION FILED DEC. 17, 1909.
963,411.
Patented July 5, 1910.
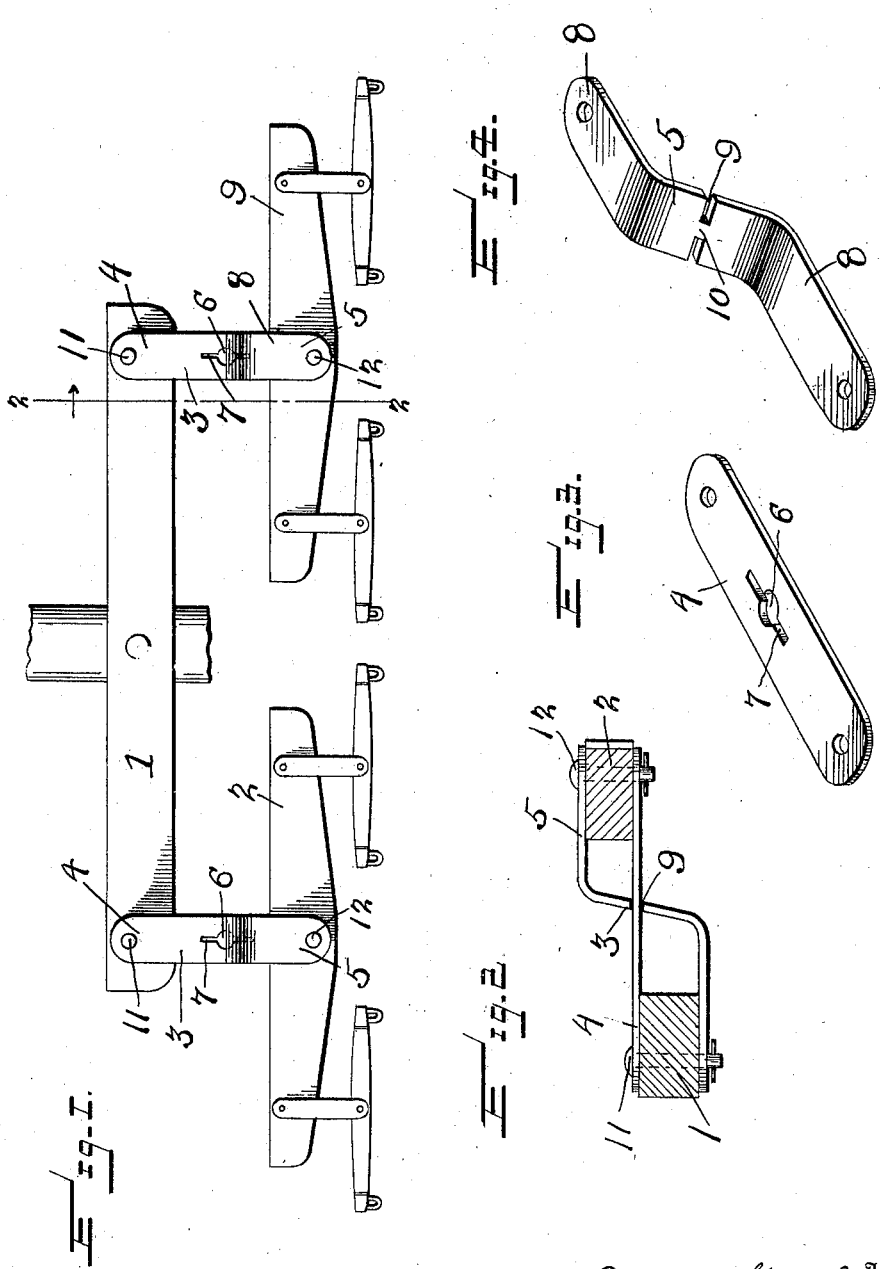

UNITED STATES PATENT OFFICE.

JAMES H. WHAN, OF MERTILLA, KANSAS.

WHIFFLETREE CONNECTION.

963,411.     Specification of Letters Patent.     Patented July 5, 1910.

Application filed December 17, 1909. Serial No. 533,681.

*To all whom it may concern:*

Be it known that I, JAMES H. WHAN, a citizen of the United States, residing at Mertilla, in the county of Meade and State of Kansas, have invented certain new and useful Improvements in Whiffletree Connections, of which the following is a specification, reference being had to the accompanying drawings.

This invention relates to improvements in devices for connecting doubletrees to a four horse evener, and for analogous purposes.

The object of the invention is to provide a simple and practical whiffletree connection composed of two detachably connected and interlocked plates which will throw the whiffletree or doubletree in a plane above the evener bar to which it is attached.

With the above and other objects in view, the invention consists of the novel construction, combination and arrangement of parts, hereinafter fully described and claimed, and illustrated in the accompanying drawings in which:—

Figure 1 is a plan view of a four horse draft equalizer showing the application of my improved whiffletree connections; Fig. 2 is a detail vertical section taken on the plane indicated by the line 2—2 in Fig. 1; Figs. 3 and 4 are perspective views of the two members of the connection.

Referring more specifically to the drawings 1 denotes a four horse evener bar and 2 denotes two doubletrees which are attached to the bar 1 by my improved whiffletree connections 3. Each of the latter consists of two metal plates or strips 4, 5, which have an interlocked detachable connection. The plate 4 is straight and has at its center a circular opening 6 with which communicate notches 7, the latter being formed at diametrically opposite points in the opening 6 and extending centrally and longitudinally of the plate 4. The other plate 5 has its ends curved or bent longitudinally in opposite directions, as shown at 8, and the central portion of said plate 5 is formed at opposite points in its side edges with inwardly or transversely extending notches or slots 9. These notches 9 form between them a connecting neck 10, which latter is of slightly less width than the diameter of the circular opening 6. The slots or notches 7 in the plate 4 are of such length that the plate 5 may be passed through them until the notches 9 register with the walls of the slots or notches 7, whereupon the plate 5 may be turned to bring the connecting portion or neck 10 into the opening 6. When the parts are thus engaged they will be interlocked and their adjacent ends will be superposed to receive between them the whiffletree and evener bar or member. In the embodiment of the invention illustrated the rear ends of the plates or strips 4, 5, receive the bar 1 between them and are pivoted to the latter by a vertical pivot 11, the rear end of the straight plate 4 being disposed on top of the bar 1. The forward ends of said plates receive between them the doubletree or whiffletree 2, which latter is pivotally mounted on a pivot pin 12. Owing to this arrangement it will be seen that the whiffletree will be disposed in a plane above that of the evener bar 1.

Having thus described the invention what is claimed is:

1. A whiffletree connection consisting of a straight plate formed with a centrally arranged circular opening and with oppositely disposed communicating notches extending longitudinally of said plate, and a second plate having its ends bent longitudinally in opposite directions and its central portion formed with oppositely disposed transverse notches to form between them a connecting neck, the second plate being adapted to pass through the notches in the first mentioned plate and said neck being adapted to enter said circular opening, whereby the ends of the two plates will be oppositely disposed in spaced relation.

2. The combination with an evener bar and a whiffletree, of a connection consisting of a straight plate formed with a centrally arranged circular opening and with communicating notches extending in opposite directions and longitudinally of said plate, a second plate having its ends curved longitudinally in opposite directions, and its central portion formed at opposite points with inwardly extending transverse notches, the latter forming between them a connecting neck, the second mentioned plate being adapted to pass through the notches in the first mentioned plate, and said neck being adapted to enter said circular opening to dispose the ends of the two plates in superposed spaced relation to receive said evener bar and whiffletree between them, and pivots uniting said spaced ends of the plates to said evener bar and whiffletree.

In testimony whereof I hereunto affix my signature in the presence of two witnesses.

JAMES H. WHAN.

Witnesses:
  JAMES R. GILLICK,
  STEPHEN B. MONTGOMERY.